(12) United States Patent
Singh et al.

(10) Patent No.: US 8,424,107 B2
(45) Date of Patent: Apr. 16, 2013

(54) SELECTIVELY EXPOSING BASE CLASS LIBRARIES BASED ON APPLICATION EXECUTION CONTEXT

(75) Inventors: Yashwardhan Singh, Hyderabad (IN); Srinivas Nadimpalli, Hyderabad (IN); Srivatsan Kidambi, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 12/815,018

(22) Filed: Jun. 14, 2010

(65) Prior Publication Data

US 2011/0307959 A1    Dec. 15, 2011

(51) Int. Cl.
*G06F 21/00* (2006.01)
(52) U.S. Cl.
USPC ........ 726/30; 726/4; 726/5; 726/26; 713/156; 713/166; 713/182
(58) Field of Classification Search ............... 726/30
See application file for complete search history.

(56) References Cited

U.S. PATENT DOCUMENTS

| | | | | |
|---|---|---|---|---|
| 7,546,602 B2* | 6/2009 | Hejlsberg et al. | ............... | 719/313 |
| 7,664,786 B2* | 2/2010 | Oh et al. | ............... | 707/620 |
| 7,743,423 B2* | 6/2010 | Lange et al. | ............... | 726/26 |
| 7,814,184 B2* | 10/2010 | Mandato et al. | ............... | 709/221 |
| 2005/0172126 A1* | 8/2005 | Lange et al. | ............... | 713/166 |
| 2006/0101442 A1* | 5/2006 | Baumgart et al. | ............... | 717/162 |
| 2007/0136392 A1* | 6/2007 | Oh et al. | ............... | 707/201 |
| 2008/0127069 A1* | 5/2008 | Ryazanov | ............... | 717/116 |
| 2008/0196025 A1* | 8/2008 | Meijer et al. | ............... | 717/177 |
| 2010/0058283 A1* | 3/2010 | Dussud et al. | ............... | 717/100 |
| 2010/0083238 A1* | 4/2010 | Barnett et al. | ............... | 717/136 |
| 2011/0016199 A1* | 1/2011 | De Carlo et al. | ............... | 709/220 |
| 2011/0016514 A1* | 1/2011 | De Carlo et al. | ............... | 726/5 |

OTHER PUBLICATIONS

Working with RIA Services Solutions, MSDN, http://msdn.microsoft.com/en-us/library/ee707336(VS.91,printer).aspx, 4 Pages, Retrieved Apr. 14, 2010.
.NET Framework Conceptual Overview, MSDN, http://msdn.microsoft.com/en-us/library/zw4w595w(printer).aspx, 4 Pages, Published 2008.
Mark Brunelli, SOA Breaking Down Reusable-Code Barriers, http://searchsoa.techtarget.com/news/article/0,289142,sid26_gci968206,00.html, 3 Pages, Published Jun. 2, 2004.
Jean-Luc David, Setting Up and Using the Compact .NET Framework, http://articles.techrepublic.com.com/5100-10878_11-5058486.html, 4 Pages, Published Aug. 19, 2003.

\* cited by examiner

*Primary Examiner* — Kambiz Zand
*Assistant Examiner* — Yonas Bayou
(74) *Attorney, Agent, or Firm* — Workman Nydegger

(57) ABSTRACT

Allowing access to APIs based on application context. A method includes determining an application context for an application. A layer is determined for a base class library. Layers of the base class library are defined by one or more developer defined attributes associated with an API, where the API is included in the base class library. The base class library is divided into layers based on the developer defined attributes. The one or more attributes define which application contexts can access the API. If the layer matches the application context then access by the application to the API is allowed.

18 Claims, 2 Drawing Sheets

SELECTIVELY EXPOSING BASE CLASS LIBRARIES BASED ON APPLICATION EXECUTION CONTEXT

BACKGROUND

Background and Relevant Art

Computers and computing systems have affected nearly every aspect of modern living. Computers are generally involved in work, recreation, healthcare, transportation, entertainment, household management, etc.

Often, there is a need to expose different application programming interface (API) functionality for different platforms, such as managed code platforms or application models. Managed code is computer program code that requires and will only execute under the "management" of a Common Language Runtime (CLR) virtual machine. In this same context programmers also refer to code that does not depend on the Common Language Runtime as unmanaged.

Often the different application models provide different sets of functionalities and thus use different base class libraries, although with major portions of common code.

However, when deploying the different application models, there may be a need to conserve storage space rather than having two different runtimes, each with significant portions of overlapping code. For example, mobile devices, such as cell phones, pdas, etc. may have less storage space than other less portable or larger devices. Scrutiny should be given to what is installed on the mobile devices and efforts should be made to optimize storage space.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a computing environment. The method includes acts for allowing access to APIs based on application context. The method includes determining an application context for an application. A layer is determined for a base class library. Layers of the base class library are defined by one or more developer defined attributes associated with an API, where the API is included in the base class library. The base class library is divided into layers based on the developer defined attributes. The one or more attributes define which application contexts can access the API. If the layer matches the application context then access by the application to the API is allowed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein allow for the use of a single runtime where classes within the runtime are annotated with information indicating application contexts for exposing application programming interfaces (APIs). This allows selective exposure of APIs for different application models.

The following illustrates a very specific example, but the concepts illustrated can be applied generally to base class libraries in general. Illustrating one example, Silverlight® for Mobile (SLM) uses .Net® Compact Framework (NETCF) (both available from Microsoft Corporation of Redmond Wash.) as the base runtime. This is to reuse a single runtime and single set of base class libraries (BCL), such as for example on space constrained mobile devices that have less storage space than less mobile or non-mobile devices, rather than deploying a parallel runtime. As such, the NETCF runtime includes support for different application models—the traditional NETCF and the SLM app models.

The existing NETCF API support is richer than what is available to SLM applications. Thus, embodiments may only expose a subset of the available API surface to SLM applications. It may also be desirable to restrict the API surface area due to security reasons.

Embodiments may implement the preceding by dividing the BCL into three layers. The BCL surface area exposed to applications running under different contexts (regular NETCF or SLM), is determined based on the different level of accessibility to these layers from the user code and within these layers themselves. Accessibility of the layers is determined by a custom attribute annotation in BCL code. In particular, each class or method may have an attribute that indicates to which application contexts the class should be exposed. Some classes or methods may specifically exclude an attribute where the absence of the attribute is an indicator as to the application context and layer accessibility. This can be used to essentially create logical views of the same physical class libraries.

Thus, embodiments may facilitate a runtime's ability to reuse the same BCL for supporting more than one application model. This can help to greatly reduce the runtime and working set size. In particular, common code needed for similar functionality in different applications does not need to be replicated multiple times, once for each application context. Rather, embodiments may use code annotation to determine the API's exposure in a particular application context.

Embodiments may include functionality to statically verify the correctness of BCL layer partitioning. Examples are illustrated below.

Figure 1:
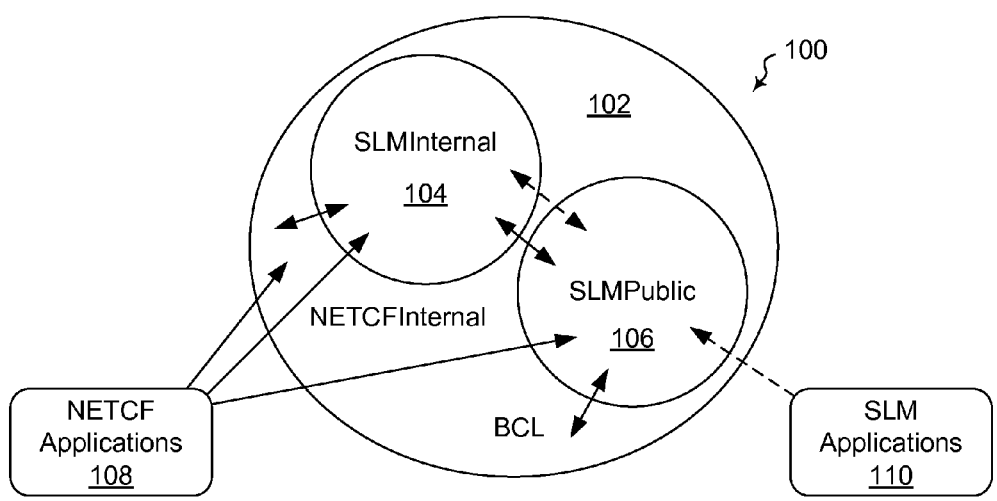
FIG. 1 illustrates a diagram illustrating different code levels.

Referring now to FIG. 1, a diagram 100 illustrating base class libraries for one embodiment are illustrated. The base class libraries are divided into layers (three layers are illustrated in FIG. 1)—NETCFInternal 102, SLMInternal 104, and SLMPublic 106. This is done by annotating the code at class and/or member level. Types and/or methods can be annotated. In particular, classes and members can include one or more attributes which define to which division(s) a class or member exposes functionality.

At run time, the common language runtime (CLR) reads the attribute on the class or member and determines if an application based on application context can access the attribute. In the illustrated example, no restrictions are imposed when executing the code under regular NETCF context. That is, user applications are allowed to access the complete BCL illustrated at 102 when executing in NETCF context as illustrated at 108.

However, when running in Silverlight® for Mobile context, applications can only access the SLMPublic 106 APIs. In the embodiment illustrated, the SLMPublic 106 and SLMInternal 104 layers can access each other. The NETCFInternal 102 layer is self-contained and any code running in SLM context, as illustrated at 110, is not allowed to access it.

The present implementation illustrated in FIG. 1 is directed towards supporting two different application models. However, embodiments can be extended to more than two application models using additional layers.

Embodiments may extend to transparency like models as well. Transparency is a feature that helps developers write more secure framework libraries that expose functionality to partially trusted code. A whole assembly, some classes in an assembly, or some methods in a class can be marked as security-transparent. Security-transparent code cannot elevate privileges. In the .Net® Framework, this restriction has three specific ramifications: (1) Security-transparent code cannot perform asserts. (2) Any link demand that would be satisfied by security-transparent code becomes a full demand. (3) Any unsafe (unverifiable) code that must execute in security-transparent code causes a full demand for the skip verification security permission. Similarly, Silverlight® with CoreCLR has a simplified model of transparency not implementing demands. Embodiments may implement transparency like functionality by using the annotation concepts described above. However, unlike transparency, embodiments can be used to completely block off a part of the API—while transparency grants access to the full API with different privileges.

While the preceding example is illustrated in the context of the .Net® Compact Framework and the new Silverlight® for Mobile application models, embodiments are flexible enough to provide support for other applications as well.

The following discussion illustrates how code annotations may be performed. In one embodiment, code annotations are done at type and method levels. The code annotations can be used to define what layer a type or method is in. In the example illustrated in FIG. 1, types and methods in the NETCFInternal layer is annotated with a CompactFrameworkInternalAttribute. Public code in SLMInternal layer is annotated with a SilverlightInternalAttribute. Any internal and private code in this layer is left un-annotated, because that code by definition cannot be accessed by user applications. In the embodiment illustrated, the SLMPublic layer is left totally un-annotated. Annotations at a containing type level apply to all the contained members. If a public type has no annotations, in the present example, it is in SLMPublic layer. However, the annotations can still be done at individual method levels.

As noted, in the preceding example, code is annotated at type and method levels. In the embodiment illustrated any enumerators or fields are not explicitly annotated. This is because for some embodiments they can be considered non-threatening. In particular, enumerators map to harmless integer values. Any field of a primitive type or referencing an object of an accessible layer is also considered safe. Any field referencing an object of an in-accessible layer cannot be accessed because of the inaccessibility of its type and hence is left un-annotated.

Some embodiments may use an FxCop based tool (a static code analysis tool available from Microsoft Corporation) to identify the different layers at run time. In particular, the FxCop based tool can be used to identify the annotations and hence the different layers. Once the annotations have been identified, and thus the layers identified, the application context based restrictions described above can be applied to the different layers.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
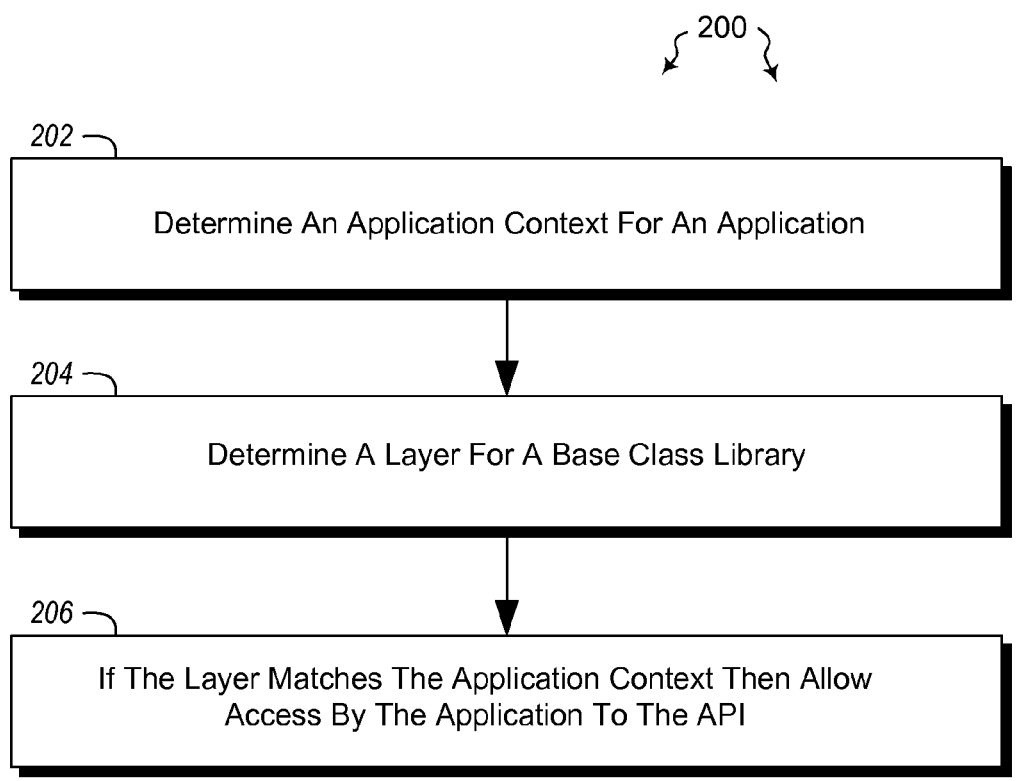
FIG. 2 illustrates a method of allowing access to APIs based on application context.

Referring now to FIG. 2, a method 200 is illustrated. The method may be practiced in a computing environment and includes acts for allowing access to APIs based on application context, the method includes determining an application context for an application (act 202). In the examples illustrated previously, embodiments determine if the application is running in the full .Net® Compact Framework or Silverlight® for Mobile. However, other embodiments may be implemented as well. When performing this act, the application context may relate to application contexts that share some, but not all, functionality. For example, different application models provide different sets of functionalities but with major portions of common code.

The method 200 further includes determining a layer for a base class library (act 204). Layers of the base class library are defined by one or more developer defined attributes associated with an API. The API included in the base class library. The base class library is divided into layers based on the developer defined attributes. In some embodiments, the method 200 may be implemented where portions of the base class library are annotated with the developer defined attributes. The one or more attributes define which application contexts can access the API. For example, as illustrated in FIG. 1 and the related description, attributes can be used define the SLMInternal layer 104, the SLMPublic layer 106 and the NETCFinternal layer 102. Dividing the base class library into layers can create a plurality of logical views of the same base class library such that the base class library is used to support a plurality of application models.

Embodiments may be implemented where at least one layer is left totally un-annotated with a developer defined attribute. In this embodiment, the lack of annotations defines the at least one layer. An example of this is illustrated above where the SLMPublic layer is left totally un-annotated.

Embodiments may be implemented where annotations are performed at type and method levels. In some embodiment, annotations at a containing type level apply to all the contained members.

The method 200 further includes, if the layer matches the application context then allowing access by the application to the API (act 206). In particular, applications will be allowed to access layers appropriate for the given application context.

In some embodiments, the method 200 may be practiced where the base class library is a managed code base class library that requires and will only execute under the management of a Common Language Runtime virtual machine.

In some embodiments, the method 200 may be practiced where the method further includes enforcing security restrictions by not allowing one or more applications access the API based the one or more application contexts of the one or more applications. In one particular example, as explained previously above, in one embodiment, transparency like restrictions can be accomplished by using features of some embodiments.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of allowing access to APIs based on application context, the method comprising:
    determining a first application context for a first application;
    determining a first layer for a single base class library included in a single runtime deployed on a device, the single runtime exposing different subsets of available API surfaces of the single runtime to different applications such that some applications have richer API support when using the single runtime than other applications using the same single runtime, and wherein layers of the base class library are defined by one or more developer defined attributes associated with APIs, the APIs being included in the base class library, wherein the base class library is divided into layers based on the developer defined attributes, the developer defined attributes defining applications to which a given API of the single base class layer is exposed, such that the one or more attributes define which application contexts can access the given API;

determining that the first layer matches the first application context and allowing access by the first application to one or more API in the first layer;

determining a second application context for a second application that is different than the first application;

determining a second layer for the single base class library included in the single runtime deployed on the device; and determining that the second layer matches the application context and allowing access by the second application to one or more API in the second layer of the single base class library while restricting access to one or more APIs included in the first layer of the single base class library that are not also included in the second layer of the single base class library such that the first application has richer API support than the second application.

2. The method of claim 1, wherein the base class library is a managed code base class library that requires and will only execute under the management of a Common Language Runtime virtual machine.

3. The method of claim 1, wherein the method further comprises enforcing security restrictions by not allowing one or more applications access the API based the one or more application contexts of the one or more applications.

4. The method of claim 1, further comprising installing the base class library on a mobile device.

5. The method of claim 1, wherein performing the method creates a plurality of logical views of the same base class library such that the base class library is used to support a plurality of application models.

6. The method of claim 1, wherein portions of the base class library are annotated with the developer defined attributes.

7. The method of claim 6, wherein at least one layer is left totally un-annotated with a developer defined attribute, such that the lack of annotations defines the at least one layer.

8. The method of claim 6, wherein annotations are performed at type and method levels.

9. The method of claim 6, wherein annotations at a containing type level apply to all the contained members.

10. In a computing environment, a method of defining allowed access to APIs based on application context, the method comprising:

determining a first application context for a first application;

determining one or more first APIs in a single base class library of a single runtime that should be available to the first application;

adding the one or more first APIs to a first layer for the base class library, the first layer for the base class library being a layer accessible to the first application, wherein adding the one or more first APIs to the first layer comprises defining one or more developer defined attributes associated with the first APIs, wherein the base class library is divided into layers based on the developer defined attributes, the developer defined attributes defining applications to which the one or more APIs of the single base class layer are exposed such that the one or more attributes define which application contexts can access the one or more APIs determining a second application context for a second application;

determining one or more second APIs in the single base class library of the single runtime that should be available to the second application;

adding the one or more second APIs to a second layer for the base class library, wherein adding the one or more second APIs to the second layer comprises defining one or more developer defined attributes associated with the second APIs such that the second application can access the one or more API in the second layer of the single base class library but cannot access one or more APIs included in the first layer of the single base class library that are not also included in the second layer of the single base class library such that the first application has richer API support than the second application.

11. The method of claim 10, wherein the base class library is a managed code base class library that requires and will only execute under the management of a Common Language Runtime virtual machine.

12. The method of claim 10, wherein the method further comprises defining security restrictions based on the developer defined attributes by not allowing one or more applications access the API based the one or more application contexts of the one or more applications.

13. The method of claim 10, further comprising installing the base class library on a mobile device.

14. The method of claim 10, wherein performing the method creates a plurality of logical views of the same base class library such that the base class library is used to support a plurality of application models.

15. The method of claim 14, wherein portions of the base class library are annotated with the developer defined attributes.

16. The method of claim 14, wherein at least one layer is left totally un-annotated with a developer defined attribute, such that the lack of annotations defines the at least one layer.

17. The method of claim 14, wherein annotations are performed at type and method levels.

18. The method of claim 14, wherein annotations at a containing type level apply to all the contained members.

* * * * *